Feb. 12, 1924.

J. ROSE ET AL

MOUSETRAP

Filed March 9, 1922

1,483,644

INVENTORS:
Jacob Rose, and
Frank E. Bowne,
BY
Wm. H. Canfield
ATTORNEY.

Patented Feb. 12, 1924.

1,483,644

UNITED STATES PATENT OFFICE.

JACOB ROSE AND FRANK E. BOWNE, OF MONTCLAIR, NEW JERSEY.

MOUSETRAP.

Application filed March 9, 1922. Serial No. 542,259.

*To all whom it may concern:*

Be it known that we, JACOB ROSE and FRANK E. BOWNE, citizens of the United States, and residents of Montclair, county of Essex, and State of New Jersey, have invented certain new and useful Improvements in Mousetraps, of which the following is a specification.

This invention relates to an improved trap, and is particularly designed as a mouse trap, which is simple in construction, thus making its operation certain.

The invention is designed to provide a trap which has two parts to be snapped together to kill the mouse, these parts having a spring for closing and for setting on the top, and having the bait receiving part accessible through the bottom so that the baiting and setting is easy and is also safe, as there is no necessity for the person using the trap to place the fingers in the clamping part of the device.

Figure 1:
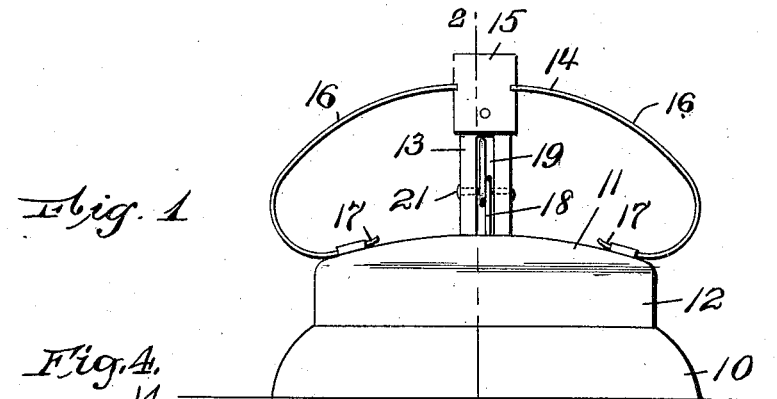
Figure 4:
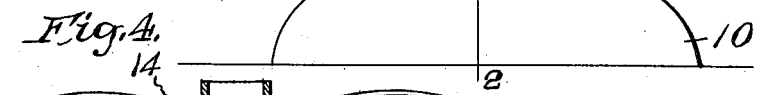
Figure 2:
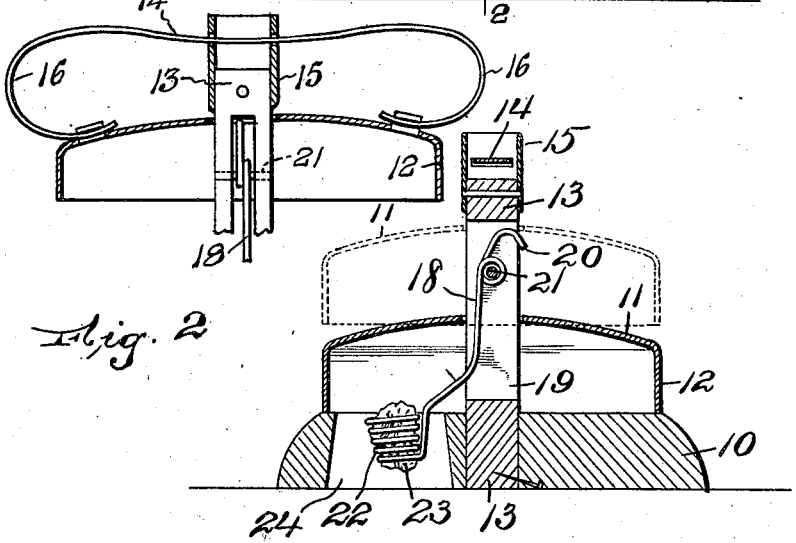
Figure 3:
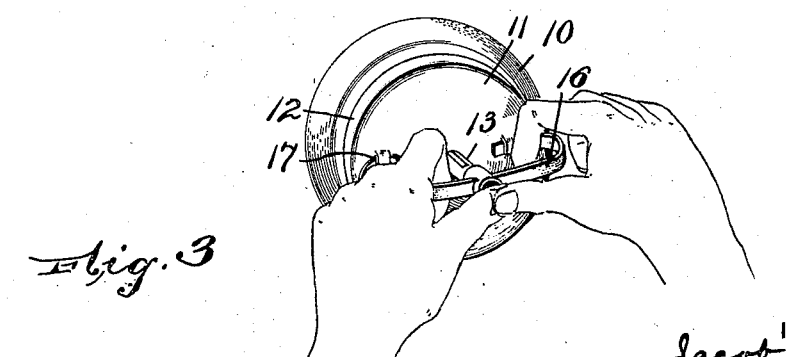

The invention is illustrated in the accompanying drawing, in which Figure 1 is a side view of a trap embodying our invention. Figure 2 is a section on line 2—2 in Figure 1, and Figure 3 is a perspective view showing the manner of setting the trap. Figure 4 is a detail section of the upper part of the trap with the killing element in set position.

The trap comprises a suitable base 10, preferably circular and of wood, and which is flat on the bottom so that it rests evenly on the floor. On the base is supported a killing element 11, usually a round metal plate with a flanged rim 12, which rim is adapted to be snapped down over the mouse and kill it.

The preferred way of mounting the plate 11 is on a central post 13. The plate 11 is pushed down and held down by a spring 14 which is secured to the post 13, as by a ferrule 15, and extends on both sides of the post in the form of loops 16 which are secured at their ends 17 to the plate 11 in such a manner that the plate is raised when the spring is pulled up. A suitable trigger 18 is arranged so as to hold the plate 11 in raised position, and which is also provided with a bait-holding part, and is shown as being arranged in the slot 19 of the post 13 and has the nose 20 on the top slightly above the pivot 21 in the form of a brad passed through the post 13.

The bait-holding part 22 is usually formed by twisting the trigger into a coiled holding portion to receive the bait 23. This bait-holding part extends down into an opening 24, which opening extends from top to bottom of the base, and while providing for access to the bait from the top, permits affixing of the bait to the trigger from the bottom.

When the trap is to be set it will be evident that it is not necessary to put the fingers where they can be pinched or caught in the trap, as the bait is put into the bait-holding part from the bottom through the opening 24, and the trap can then be set as shown in Figure 3, using the end of the post as a bearing point for the thumbs and pulling the loops 16 back and catching the fingers of the hand through them and then pulling up. Of course the trap is tilted while the plate is being pulled up, so that the trigger has its nose 20 slightly retreated, and then the loops 16 are slowly released while the trap is tilted, so that the nose is in holding position and the parts are thus held in position to hold the plate 11 raised while the trap is undisturbed, so that the slightest movement of the trigger will permit the spring 14 to snap the plate 11 down solidly on the mouse which has disturbed the bait on the trigger.

We claim:

1. A trap comprising a base, a killing element mounted so as to move to and from the base, a trigger having a bait-holding part and adapted to hold the killing element in raised position, and a spring for snapping the killing element shut when released, said spring being arranged on the back of said killing element and extending transversely, thereby forming a means whereby the trap can be set.

2. A trap comprising a base, a killing element mounted so as to move to and from the base, a trigger having a bait-holding part and adapted to hold the killing element in raised position, and a spring for snapping the killing element shut when released, said spring being arranged on the back of said killing element and forming a means whereby the trap can be set, the base having an opening whereby the bait can be inserted from the bottom and out of the path of travel of the killing element.

3. A trap comprising a base with a central post, a killing plate slidable on the post, a flat looped spring secured to the post and to the plate and forming a grip for moving the plate, and a trigger pivoted to the post and having a nose to engage the plate and also having a bait-receiving part, the base having an opening from top to bottom in which the bait-receiving part is suspended.

In testimony that we claim the foregoing, we have hereto set our hands, this 4th day of March, 1922.

JACOB ROSE.
FRANK E. BOWNE.